(12) United States Patent
Jernstrom (10) Patent No.: US 9,214,813 B2
(45) Date of Patent: Dec. 15, 2015

(54) DEVICE AND METHOD FOR LIMITING AN ELECTRICAL CURRENT

(75) Inventor: Bjorn Jernstrom, Jarfalla (SE)

(73) Assignee: Ferroamp Elektronik AB, Spanga (SE)

( * ) Notice: Subject to any disclaimer, the term of this patent is extended or adjusted under 35 U.S.C. 154(b) by 404 days.

(21) Appl. No.: 13/261,631

(22) PCT Filed: Oct. 11, 2011

(86) PCT No.: PCT/SE2011/000180
§ 371 (c)(1),
(2), (4) Date: Aug. 7, 2013

(87) PCT Pub. No.: WO2012/050501
PCT Pub. Date: Apr. 19, 2012

(65) Prior Publication Data
US 2013/0314057 A1     Nov. 28, 2013

(30) Foreign Application Priority Data
Oct. 12, 2010   (SE) ...................................... 1001007

(51) Int. Cl.
*H02J 3/08*    (2006.01)
*H02J 3/26*    (2006.01)
*H02J 3/18*    (2006.01)

(52) U.S. Cl.
CPC ... *H02J 3/26* (2013.01); *H02J 3/18* (2013.01); *Y02E 40/30* (2013.01); *Y02E 40/50* (2013.01)

(58) Field of Classification Search
USPC .......................... 323/209–211, 212–216, 217
See application file for complete search history.

(56) References Cited

U.S. PATENT DOCUMENTS

| | | | |
|---|---|---|---|
| 3,450,983 A * | 6/1969 | Koppelmann et al. | 323/210 |
| 5,181,180 A | 1/1993 | Munro | |
| 5,309,346 A * | 5/1994 | Gyugyi | 363/54 |
| 7,242,110 B2 | 7/2007 | Matsumoto et al. | |

FOREIGN PATENT DOCUMENTS

| | | |
|---|---|---|
| CH | 641295 | 2/1984 |
| SE | 515272 | 7/2001 |

OTHER PUBLICATIONS

Vazquez N et al "A current limiter based on an active current power filter", 11th IEEE International Power Electronics Congress, 2008. CIEP 2008. Aug. 24, 2008; ISBN 978-1-4244-2718-5 ; ISBN 1-4244-2718-5.
Jain S K et al "A Control Algorithm for Compensation of Customer-Generated Harmonics and Reactive Power" IEEE Transactions on Power Delivery, Jan. 2004; doi:10.1109/TPWRD.2003.820191; ISSN 0885-8977.

* cited by examiner

*Primary Examiner* — Nguyen Tran
(74) *Attorney, Agent, or Firm* — Mark P. Stone (57) ABSTRACT

The invention relates to a device (50) for limiting an electrical current in an electrical conductor of an electrical installation. The device (50) comprises a receiving unit adapted to receive a measurement of the electrical current in the electrical conductor, and further comprising a limiting unit adapted to limit said electrical current when the measured electrical current reaches a threshold. The device (50) is distinguished by comprising an obtaining unit adapted to obtain electrical energy from a second electrical conductor, wherein the limiting unit is adapted to inject said obtained electrical energy as an electrical current into the first electrical conductor, whereby the injected electrical current constitutes a replacement for at least a part of the first electrical current, which first electrical current is thereby limited. The invention also relates to an electrical system and a method for limiting an electrical current in an electrical conductor of an electrical installation.

20 Claims, 5 Drawing Sheets

*Prior Art*

DEVICE AND METHOD FOR LIMITING AN ELECTRICAL CURRENT

FIELD OF THE INVENTION

The present invention concerns a device according to the preamble of claim 1. Further, it concerns an electrical system according to claim 14 and a method according to the preamble of claim 15.

BACKGROUND ART

Figure 1:
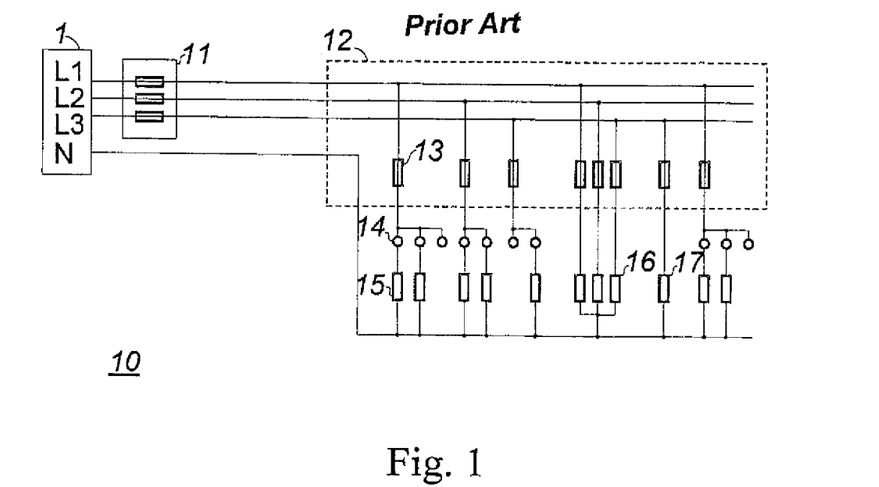
FIG. 1 illustrates a schematic view of an electrical installation.

Residential houses or small industries that have a two or three phase supply of electricity have a set of mains fuses or mains circuit breakers that limits the maximum current that can be drawn from the grid as well as protects the electrical installation. FIG. 1 depicts, as an example, such an electrical installation 10 having mains fuses 11, a distribution panel 12, branch fuses 13, outlets 14 and different loads 15, 16 and 17. These reference numbers are used throughout the description for corresponding devices.

It is desired to keep the mains fuse rating as low as possible since a higher rating will result in higher fees to the grid company, and will require a larger conductor area in the supply cables. Larger conductor areas will increase installation costs for a new system and render conversions of an existing system to such larger area conductors quite expensive. However, the rating must still be high enough to enable all different load conditions without blowing a mains fuse or tripping a mains circuit breaker.

In residential houses or small industries, the current in the phase conductors varies quite rapidly due to the many different loads such as heaters, cookers, kettles, ovens, stoves, hair dryers, vacuum cleaners etc. Because of the large variation in the load, the mains fuse rating need to be set high enough not to blow during peak load conditions. However, most of the time the actual load is far below the fuse rating.

Figure 6:
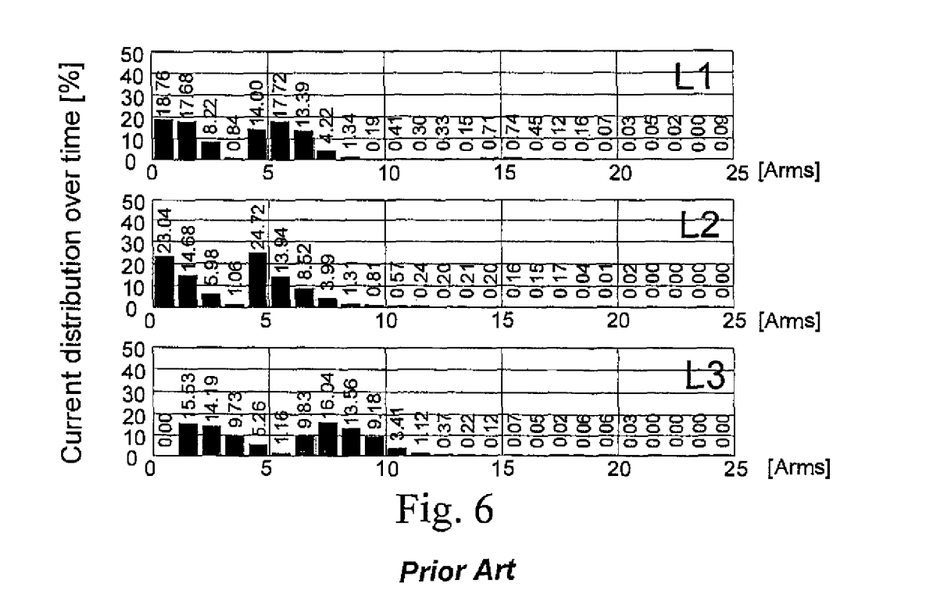
FIG. 6 illustrates an example of a distribution of phase currents over time in an electrical installation.

FIG. 6 shows a statistical current distribution in a typical residential house. As can be seen, 99% of the time, the current in the three phase conductors are below 16 A, although peaks up to 25 A occurs. The mains fuses and the supply cables must thus be rated to at least 25 A.

Thus, there is a tradeoff between selecting a small mains fuse rating for cost reasons, but the rating should still be high enough to prevent blowing a fuse during peak load conditions.

A solution to this problem is provided by load shedding switches. They are current limiting devices that sense the supply phase currents and cuts off a preselected load if the supply current exceeds the mains fuse rating. This is for example described in SE 515 272 and CH 641 295.

Disadvantages with these methods are that the disconnected load obviously can not be utilised during the time it is disconnected, and a further problem is that the load that is disconnected must either be a three phase load or a load on the same phase that is currently exceeding the mains fuse rating. In many households/small industries there are not many three phase loads that directly can be disconnected. Further many loads are plug-connected movable equipment while traditional load shedding switches only work with permanently installed equipment.

Further, modern homes/industries are getting more and more single phase loads, since there has been a propensity for manufacturers to move to such single phase devices for all but the most power consuming devices.

Figure 2:
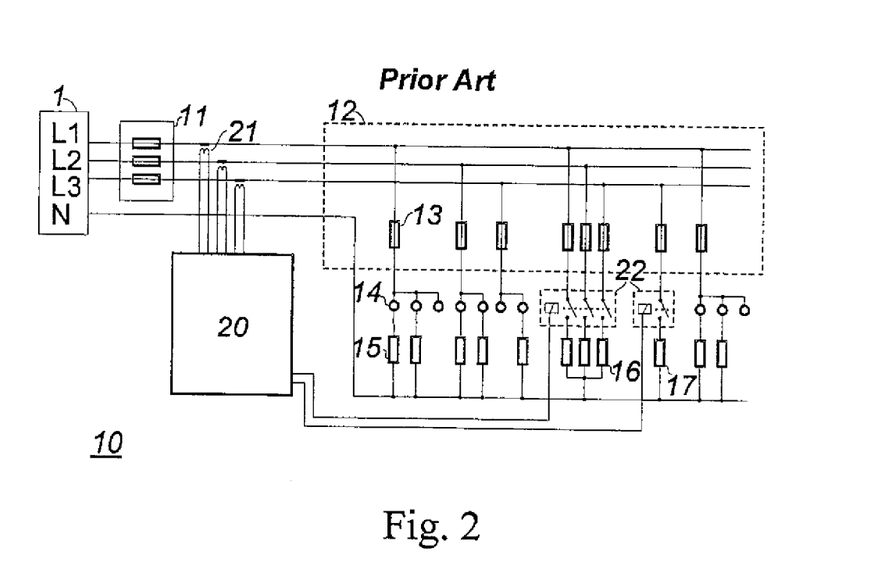
FIG. 2 illustrates a schematic view of an electrical installation with a current limiter by load shedding according to prior art.

Many products on the market are available for the purpose of limiting the supply phase currents below the capacity of the mains fuses or the mains circuit breaker. They all work by:

a) Disconnecting preselected loads during phase current peaks, as described above. Here loads are disconnected using mechanical relays in order to prevent an exceeding of the mains fuse rating. Refer to FIG. 2 for a diagrammatic outline of such a system. Relays 22 can be used to shed or disconnect loads 16, 17 when any electric current through any fuse/circuit breaker 11 approaches the rating of the same.

or b) Switching a load from one phase to another

Figure 3:
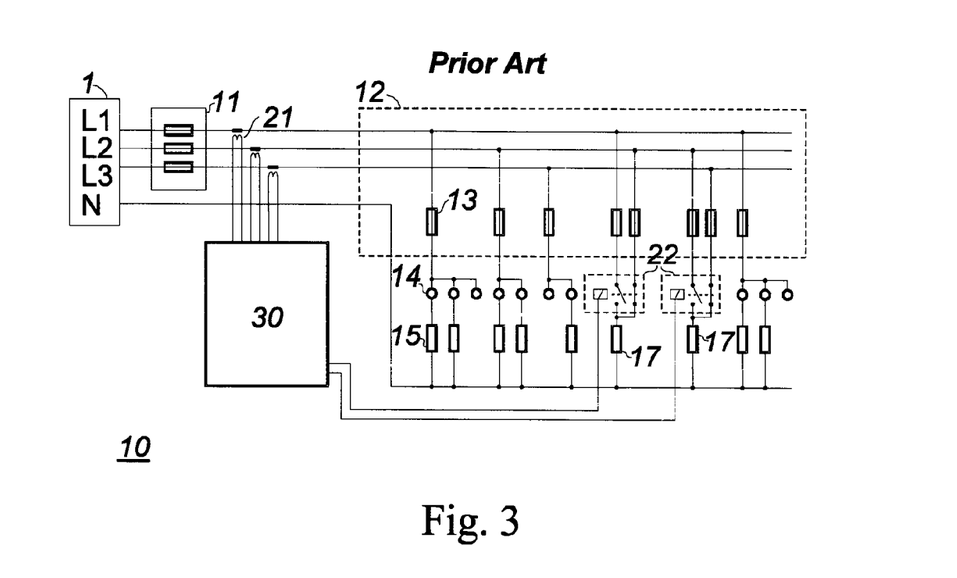
FIG. 3 illustrates an electrical installation with a current limiter by load transfer according to prior art.

This is for instance described in U.S. Pat. No. 5,181,180 Munro, and by U.S. Pat. No. 7,242,110 Matsumoto et al. These references describe the use of relays to disconnect loads or transfer loads between phases. Refer to FIG. 3 for a diagrammatic outline of such a system. Relays 22 can be used to transfer loads 17 from one phase conductor to another when any electric current through any fuse/circuit breaker 11 approaches the rating of the same.

Both these methods address the problem of overload of a supply conductor but nevertheless introduce some disadvantages. For instance, when a load is transferred there will be some electric transients due to the phase shift between the phase conductors. Such transients may shut down sensitive electronic equipment.

Further, the system must have knowledge about which loads may be transferred or disconnected, i.e. careful planning is required to preselect loads for disconnection and loads may need to be connected to different phases to balance consumption. Also, despite such (often laborious) planning of an electrical installation, there will be a poor function in systems with many portable loads, since the magnitude and placement of such movable loads cannot be anticipated and therefore not taken into account for. Of course, for any disconnected load, such loads cannot be utilised during the time they are disconnected.

SUMMARY OF THE INVENTION

It is an object of the present invention to propose a solution for or a reduction of the problems of prior art. A main object is consequently to propose an alternative device for limiting a current in an electrical conductor.

According to the invention this is accomplished with a device having the features of claim 1.

By changing the paradigm of current limiters from relay shedding of loads to a transfer of electrical energy between electrical conductors by electrical current injection, several advantages are achieved. Firstly, if there is headroom in any electrical conductor, for instance one of the phase conductors of a three phase system, energy can simply be transferred from this conductor to the one that needs to be limited which avoids the need for a turning off of a load connected to the strained conductor. Thus, the discomfort/disadvantage of disconnecting a load is avoided. Further, the problem of planning and selecting which load(s) to disconnect does not have to be addressed anymore. Thus there is no more a need for laborious load planning/selection during installation of an electrical installation. Further, since the device does not have to be active (does not have to obtain or inject electrical energy) when there is no electrical current threshold that is reached or surpassed, the device can be made quite energy-saving in that state, since it only has to monitor electrical currents for threshold overruns. Further more, the earlier drawback that it was hard to predict which electrical conductor a moving single phase load would use and thus where to disconnect such a load in an electrical installation is also avoided since the device of the invention will automatically take such a load into consideration. Also, the earlier designs of current limiting devices where a load was transferred via a relay from one electrical conductor to another is also improved upon in that aspect that the previous transfer of the prior art could only be effected for complete loads and not for a part of a load. The device of the invention transfers arbitrary (within the limits of the rating of the device) amounts of electrical energy between electrical conductors. Thus, the device of the invention provides for a fine grained transfer of energy between different conductors which would correspond to a prior art load transfer device being able to transfer partial loads between different electrical conductors (they can not). Thus, for the invention, all of the available power of the electrical conductors can always be used if needed. In the prior art it could happen that a load that was desired to be transferred to another electrical conductor could not be transferred since the conductor to which it was to be transferred could not accommodate all of the load in the available headroom.

The invention further concerns an electrical system and a method for limiting an electrical current in an electrical conductor having advantages corresponding to those of the device.

Further advantageous embodiments are disclosed in the dependent claims.

There are certain active filters that can balance unsymmetrical loads in multi phase electrical systems. They continuously monitor and control the currents of the phases to be of the same magnitude by transferring energy between them. In this sense, they act to limit currents in such a system.

However, they differ from the invention in that they lack an adaptation to only transfer energy when currents have reached a threshold value; active filters continuously transfer energy irrespective of the magnitudes of the phase currents. The threshold adaptation of the invention provides the benefit of a saving of energy, since the transfer of energy from one phase conductor to another involves energy losses and the device of the invention is only active transferring energy when needed. In a regular setting, where there is only a need to transfer energy in 1% of the time, to keep phase currents at a threshold value, such an energy saving could be substantial.

The aforementioned active filters strive to make all phase currents of an electrical system as equal as possible. On the contrary, a device according to the invention only needs to make a minimum transfer of energy in order to keep the phase currents at or just below the threshold value. Since, again, a transfer of energy involves losses; this keeps losses at a minimum in the device according to the invention.

BRIEF DESCRIPTION OF THE DRAWINGS

Embodiments exemplifying the invention will now be described, by means of the appended drawings, on which

DETAILED DESCRIPTION OF THE INVENTION

Figure 4:
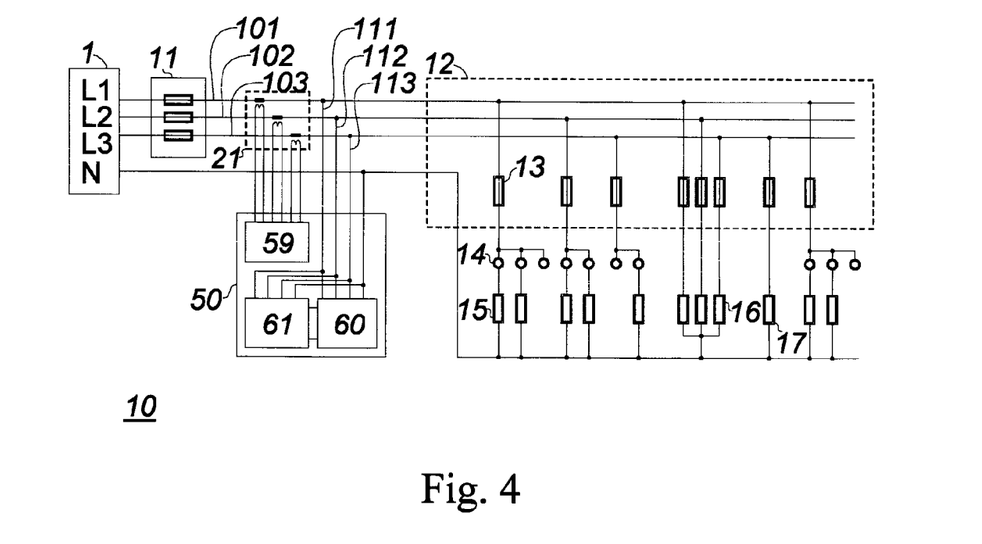
FIG. 4 illustrates an electrical installation with a current limiter according to the invention.

A basic concept of a device 50 according to the invention for limiting a (first) electrical current in a (first) electrical conductor of an electrical installation will now be described. An example of such a device 50 connected to an electrical installation is depicted in FIG. 4. The device 50 comprises a receiving unit 59. The receiving unit 59 is adapted to receive a measurement of the (first) electrical current in the (first) electrical conductor. The receiving unit 59 can either communicate with an external measuring device or may incorporate an internal measuring device that communicates the measurements to the receiving unit 59. In FIG. 4, the measuring device is incorporated in the device 50 and is connected to current sensors 21 to measure a current in an electrical conductor. In this context it should be noted that measuring a current may involve direct or indirect measurement. That is, either the current in question is measured directly or it can be measured indirectly by measuring all other currents entering or leaving a point of a conductor. Thereupon, the current can be deducted by Kirchoffs current law and can be said to be indirectly measured. Further, the device comprises a limiting unit. The limiting unit is adapted to limit said electrical current when the measured (first) electrical current reaches a (first) threshold. How this happens according to the invention is described below.

To be able to limit an electrical current in accordance with the invention, the device 50 further comprises an obtaining unit, adapted to obtain electrical energy from a second electrical conductor, that is, from an electrical conductor other than the one in which there is a current to limit. For instance, in FIG. 4, the device 50 is connected to three different conductors 101, 102, 103 by three connecting conductors 111, 112, 113. If, say, conductor 101 has been measured, with the help of sensor 21, to comprise a current that has reached a threshold at which it should be limited, then the obtaining unit of the device 50 can use any of the other, in this case, two conductors 102, 103 to obtain electrical energy from them. Particular examples of how to obtain that electrical energy follows later below.

Then, when some electrical energy is obtained from a conductor it can be injected into the strained (first) conductor. To this end, the limiting unit of the device 50 is adapted to inject said obtained electrical energy as an electrical current into the first electrical conductor. It can be said that the injected electrical current constitutes a replacement for at least a part of the first electrical current, which first electrical current is thereby limited. For instance, for the example of FIG. 4, electrical energy may be taken from conductor 102 via the connecting conductor 112 and be injected into conductor 101 via connecting conductor 111. If the current/energy that flows to a load via the distribution panel 12 is the same before and after injection, that is that the load and the mains voltage are the same, then the current coming from the source L1 must be lower after injection, since an additional current is injected closer to the load and these currents should sum up to be equal to the current going to the load according to Kirchoffs current law.

In a typical application, the current threshold of the invention is set equal to the rating of the mains fuses (and thus equal for each phase conductor) whereby the mains fuses will be protected from overloading.

Figure 8:
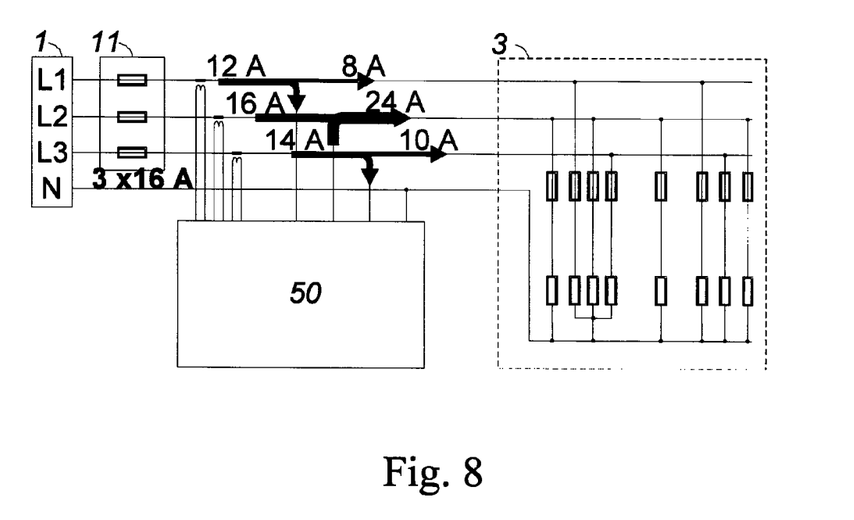
FIG. 8 illustrates the obtaining and injecting of electrical currents from different electrical conductors of an electrical installation.

To further elucidate this subject, please refer to FIG. 8. In the example of FIG. 8, the current coming from phase L2 of 16 Amperes is limited by the injection of a current from the device 50. Together they form a current of 24 Amperes going to the load 3. That is, if the current from the phase L2 would not have be supplemented by the injected current, the load 3 would have had drawn 24 Amperes from L2. Thus, in this case the current was limited to 16 Amperes by the injection.

Figure 10:
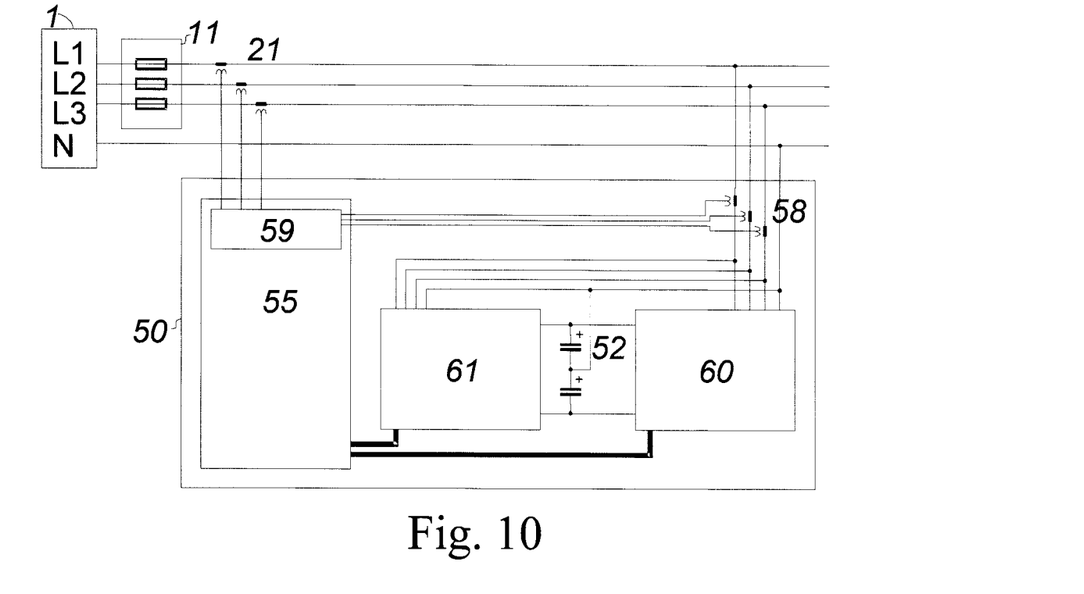
FIG. 10 illustrates an embodiment of the current limiter comprising a separate obtaining and limiting unit.

Also, with reference to FIG. 10, it should be noted that the obtaining unit 61 and the limiting unit 60 can be implemented as two physical units. However, this functionality can also be realised in a single physical unit comprising a combined obtaining and limiting unit, as will be described later with reference to FIG. 5.

To implement both obtaining and injection of electrical energy, several different principles may be used. As an example, a switch-mode power converter could act as both the obtaining unit and the limiting unit to obtain and inject electrical energy by very quickly chopping the electrical voltages/currents of the different conductors. The principles of such switch-mode power converters are well known to the skilled person.

However, other principles such as rotary power converters comprising motor/generator and controllable torque couplings are conceivable. Also, phase converters using transformers could be used to realize the invention.

It should be noted that since electrical grids are fed by voltage sources, electrical currents and electrical power are proportional to each other and are coupled. That is, it is not possible to inject/obtain electrical current without injecting/obtaining electrical power and vice versa.

That is, to limit an electrical current in a conductor is analogous to limit power in that conductor and to measure a current is analogous to measure a power.

Figure 7:
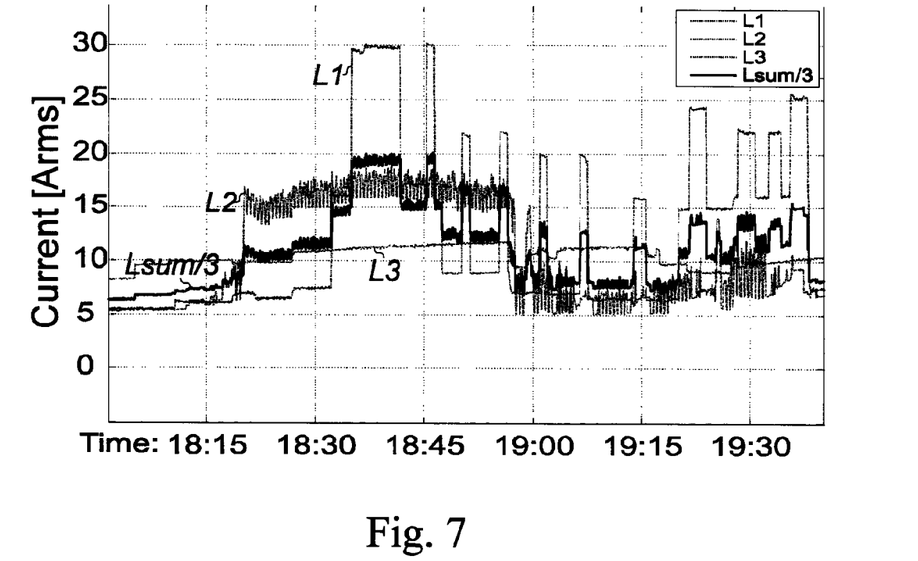
FIG. 7 illustrates an example of the magnitude of phase currents as a function of time in an electrical installation.

For an insight into a possible scenario for the available electrical energy of an electrical installation, please refer to FIG. 7. It exemplifies a measurement of the phase conductor currents over time, here current peaks up to 30 A occur in L1, at the same time, the currents are significantly lower in L2 and L3. FIG. 7 also shows the theoretical value, with peaks of 19 A, to which the currents could be limited by transferring energy between phase conductors according to the invention.

As a variant of the device according to the invention, the obtaining unit may be adapted to obtain electrical energy also from at least one additional electrical conductor. Such as from both electrical conductor 102 and 103 in FIG. 4. This is advantageous since the energy can be taken from any of these conductors 102, 103 or both simultaneously. If one of them is already overloaded the other can be used instead to provide energy for injection or both can be used to each provide a share of the needed electrical energy. In a generalised scenario, with a number of N conductors, all N conductors could be arranged to be obtained electrical energy from, and at any one time a number of N minus the number of conductors in which to inject electrical energy could simultaneously be used for such obtaining of electrical energy.

Another variant of any previous variant of the device 50 according to the invention comprises that the receiving unit is adapted to receive a further measurement of a further electrical current to be limited in at least one further electrical conductor. Considering again the example in FIG. 4, this would mean that the device 50 would be adapted to measure a current also in at least one more electrical conductor, for instance in conductors 101 and 102. Further in this variant, the limiting unit is adapted to inject said obtained electrical energy as an electrical current also into the at least one further electrical conductor when the further measured electrical current in that conductor reaches a second threshold. So, the functionality, of the earlier variants above of the device, of limiting a current in a conductor by injecting another current in that conductor is now shown duplicated for more conductors. Thus, in FIG. 4 two or even all conductors 101, 102, 103 may be monitored and injected electrical energy into, if needed. Note that there is no inherent contradiction in having the conductors to be potentially injected to coinciding with, or be the same as the conductors to be potentially obtained energy from. That is in exemplary FIG. 4, all conductors 101, 102, 103 could simultaneously serve as potential donors of energy (electrical energy would be obtained from them) and as potential receivers of energy (energy would be injected into them). The key is that energy is only injected into a conductor if a current in that conductor is measured to have reached a threshold. As soon as this current goes below the threshold, this conductor becomes a candidate to be a net donor of energy to some other conductor of the electrical installation.

Figure 9:
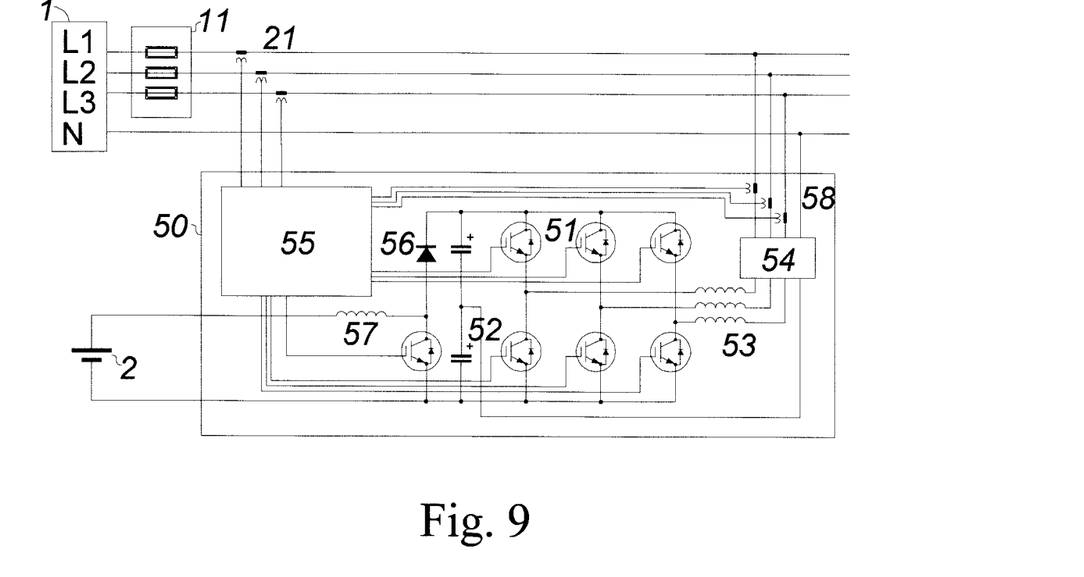
FIG. 9 illustrates an embodiment of the current limiter comprising a connection to an off-utility grid energy source.

A further variant of any of the earlier variants of the device according to the invention comprises that the obtaining unit is adapted such that at least one conductor from which to obtain electric energy from is connectible to an off-utility grid electrical source. With an off-utility grid electrical source is meant a source the electrical energy of which is not distributed to the device of the invention via a utility grid, such as any of: a battery, a wind turbine, a solar panel. That is, the obtaining unit may have connections intended for such sources and may therefore also comprise other adaptations to cater for any differences in voltage and current characteristics in these off-utility grid sources compared to those of a utility grid. An advantage of this arrangement is that if there is an overall shortage of electrical energy in the conductors that are connected to a utility grid in view of demand, the off-grid source can help to fill in that need and avoiding a blowing of a fuse. An example of such an off-utility grid source is given in FIG. 9, which depicts a battery 2.

Another advantage is that a current limiting device realised with a switch mode power converter only needs few extra components to be able to transfer electrical energy from an off-grid source to the grid.

According to a further variant of any of the previous variants of the device according to the invention, the receiving unit may be adapted to receive a measurement of an electrical current in any electrical conductor from which to obtain electrical energy and wherein the obtaining unit is adapted to obtain electrical energy from any such electrical conductor when the measured electrical current of a particular such conductor is below a third threshold. Thus, this threshold for when electrical energy may be obtained does not necessarily have to be the same as the threshold for when electrical energy may be injected and thus some extra freedom of the implementation is afforded. Of course they can be the same if desired.

The device may also comprise an electrical energy storage element in which the device is adapted to store said electrical energy after it is obtained and prior it is injected. In this way, energy can be made available for injection also at a time instant when there is no electrical energy available to obtain. For instance, for an Alternating Current (AC) system, the electrical energy storage element can serve to overcome differences in phase between different conductors, lessening disturbances otherwise potentially introduced when injecting electrical energy. Such storage elements are shown as capacitors 52 in the embodiment shown in FIG. 5.

For a variant of the device according to the invention the collective number of conductors from which to obtain or in which to inject electric energy and which are not connected to an off-utility grid source are three and constitutes three different alternating current phase conductors in a three phase electrical installation. This is the case of the variants of the device 50 as shown in FIGS. 4, 5, 8, 9 and 10. That is, the device 50 is adapted to be connected to a three phase system, which is a common electrical distribution system in many countries.

A further variant of any of the earlier variants of the device according to the invention comprises that the obtaining unit and the limiting unit are adapted to obtain and inject electrical energy in such a way to also at least reduce any harmonics in the electrical conductor into which the electrical energy is injected. This can be accomplished by measuring the current harmonics in the conductor using the current sensors 21 and injecting a current with the same amplitude but with a 180° phase difference, thereby cancelling the current harmonic in the conductor. Also, it should be mentioned that reducing harmonics will generally require both obtaining and injection of electrical energy as the harmonic current will flow in both directions during one half cycle of the voltage. Thus, the obtaining unit and the limiting unit must be used together to reduce harmonics.

A further variant of any of the earlier variants of the device comprises that the obtaining unit and the limiting unit are adapted to obtain and inject electrical energy in such a way to also correct a power factor less than 1 of the electrical conductor into which the electrical energy is injected. The principle for this is similar to the principle for reducing harmonics described above. This is also true in the sense that also obtaining electrical energy could be applied to correct the power factor.

In case of an electrical power outage of any electrical conductor into which the limiting device is adapted to inject electrical energy, the limiting unit may be adapted to inject said obtained electrical energy into such an electrical conductor. For instance in a three phase system, should one phase fail for whatever reason, the device can keep that phase energised in the electrical installation even though no electrical current is delivered from the electrical utility.

A situation may occur when all electrical current headroom in conductors available for obtaining electrical energy from is used up to inject into some other conductor. In such a situation an overload, risking blowing some fuse, could be avoided by having the device further comprising a disconnecting unit adapted to disconnect at least one load connected to any electrical conductor into which the limiting device is adapted to inject electrical energy. Such a disconnecting device would thus be activated if the electrical energy available for injection is not enough to limit the electrical current in any such electrical conductor to an electrical current threshold for that electrical current, or below.

It should be noted that, even though it has not been stated explicitly, the obtaining unit and the limiting unit are adapted to respectively refrain from obtaining and injecting any electrical energy when all electrical currents to be limited by the device are below the electrical current threshold for each such current. That is, since the limiting unit of the device only will act to limit a current by injection when such current has reached a threshold value, it is implicit that no such limiting is taking place when no current has reached the threshold for limiting that current. Thus, the device will in this case only passively monitor currents. This has the advantage that any loss involved in obtaining and limiting currents is avoided, providing a low energy consumption of the device in this mode of operation.

Any of the electrical current thresholds of the device could be varied. For instance, the device can be adapted to vary thresholds with any of: time and electrical conductor currents. An advantage of this is that mains supply cables or the mains fuses may allow a short time overload. Thus, if the thresholds are set higher for short duration current peaks, no energy is transferred between conductors and consequently no power loss occurs in the device.

It should be noted that intermittently varying thresholds according to this invention are not the same as a fluctuating set point in a control loop of an active filter striving to balance different phase currents.

A control loop set point of a balancing active filter is continuously fluctuating in order to keep phase current magnitudes equal. So, energy is continuously transferred between phases in such a system.

In contrast, a threshold of a device according to the invention could be intermittently varied in order to change when energy transfer should begin. Thus, energy transfer is not ongoing in the device according to the invention.

An example of an application with intermittently varying current thresholds is now given; In the same way as a fuse can withstand a higher current for short time periods, the current thresholds can be set higher for short current surges, and thus further contributing to lower the losses in the current limiter without increasing the risk of blowing a fuse, since the need to transfer energy can be delayed with an intermittently higher threshold value.

The device of the invention may be incorporated in many different electrical systems. Such electrical systems comprising a device 50 according to the invention could include residential house electrical systems, electrical system supplying an industrial process, and an electrical system in electrical equipment.

Exemplary Embodiment of the Device of the Invention

Figure 5:
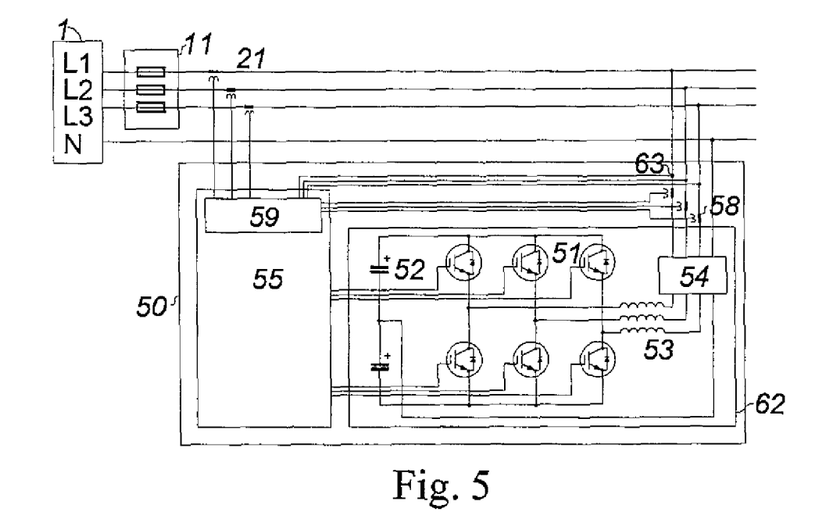
FIG. 5 illustrates a schematic view of an embodiment of the current limiter.

With reference to FIG. 5 a possible implementation of the device of the invention will be described. This is just an example and the person skilled in the art would be able to devise many other alternatives from the basic principles of the device as outlined previously.

The limiting unit and the obtaining unit are in this implementation combined into one unit 62 which comprises three half bridges, each made up of two IGBTs 51 with a fast recovery diode. (An alternative implementation with separate half bridges for the limiting unit and separate half bridges for the obtaining is of course also conceivable. Another alternative could be to implement the obtaining unit with the "Vienna rectifier" described in EP0660498) The gates of the six IGBTs are controlled from a control unit 55 that by synchronising gate drive pulses with the mains voltage determines if current is extracted from or injected in a phase conductor. The control unit 55 further applies pulse width modulation (PWM) of the gate drive signals to control the current which is extracted or injected in a phase conductor. Two different PWM control loops are used; one first controls the cycle RMS current extracted or injected in each phase conductor, a second loop synchronises the instantaneous current with the instantaneous mains voltage in each phase such that the current is extracted or injected at unity power factor.

The control unit receives measurements of the phase conductor currents through a receiving unit 59 that either could be an analog interface to current transformers or current transducers, but also a digital interface to a remote sensor, for example the sensors used in an energy meter in the electrical installation. The receiving unit 59 further receives signals from internal current sensors 58 which are used for feedback signals, for the PWM loop in the control unit, on how much current that is actually extracted or injected. The control unit also receives measurements of the mains voltages from the receiving unit 59 that sense the mains voltage in nodes 63.

Measuring could either be done directly by the receiving unit 59 as shown in FIG. 5, but also through the use of voltage transformers or remote sensors. The control unit needs the voltage information from each phase conductor in order to correctly control the IGBTs for injection or obtaining of electrical energy.

When one of the half bridges are injecting current into a phase conductor the gate drive signals are synchronised such that the upper transistor is conducting when the phase voltage is positive and the lower transistor conducts when the phase voltage is negative. The pulse width is controlled in proportion to the instantaneous output current. Thereby energy is taken from the internal energy storage capacitor (52). The conducting transistor together with the switch inductor (53) acts as a Buck converter. When current is extracted the switching scheme of the transistors is reversed, such that the positive transistor conducts when the phase voltage is negative and vice versa. The conducting transistor together with the switch inductor and the diode in the opposite transistor now acts as a Boost converter.

The Method of the Invention

The invention also comprises a method for limiting a (first) electrical current in a (first) electrical conductor of an electrical installation. Variants of the method correspond to different variants of the device of the invention and entails corresponding advantages. The method will be concisely spelled out in the following.

The method comprises:
measuring the (first) electrical current in the (first) electrical conductor,
limiting said electrical current when the measured (first) electrical current reaches a (first) threshold,
obtaining electrical energy from a second electrical conductor, and limiting said first electrical current by:
injecting said obtained electrical energy as an electrical current into the first electrical conductor, whereby the injected electrical current constitutes a replacement for at least a part of the first electrical current, which first electrical current is thereby limited.

For a variant of the method, it further comprises obtaining electrical energy also from at least one additional electrical conductor.

For a variant of any prior variant, the method further comprises receiving a further measurement of a further electrical current to be limited in at least one further electrical conductor, and injecting said obtained electrical energy as an electrical current also into the at least one further electrical conductor when the further measured electrical current in that conductor reaches a second threshold.

For a variant of any prior variant, the method further comprises, obtaining electrical energy from at least one conductor connected to an off-utility grid electrical source, such as any of: a battery, a wind turbine, a solar panel.

For a variant of any prior variant, the method further comprises
measuring an electrical current in any electrical conductor from which to obtain electrical energy and wherein the step of obtaining electrical energy from any such electrical conductor is effected when the measured electrical current of a particular such conductor is below a third threshold.

For a variant of any prior variant, the method further comprises that after said electrical energy is obtained, it is stored prior said injecting of said electrical energy.

For a variant of any prior variant, the method further comprises that the collective number of conductors from which to obtain or in which to inject electric energy and which are not connected to an off-utility grid source are three and constitutes three different alternating current phase conductors in a three phase electrical installation.

For a variant of any prior variant, the method further comprises that said obtaining and injecting of electrical energy is effected to also at least reduce any harmonics in the electrical conductor into which the electrical energy is injected.

For a variant of any prior variant, the method further comprises that said obtaining and injecting of electrical energy is effected to also correct a power factor less than of the electrical conductor into which the electrical energy is injected.

For a variant of any prior variant, the method further comprises, for a case of an electrical power outage of any electrical conductor into which to inject electrical energy, injecting said obtained electrical energy into such an electrical conductor.

For a variant of any prior variant, the method further comprises disconnecting at least one load connected to any electrical conductor into which electrical energy may be injected if the electrical energy available for injection is not enough to limit the electrical current in any such electrical conductor to an electrical current threshold for that electrical current, or below.

For a variant of any prior variant, the method further comprises refraining from obtaining and injecting any electrical energy when all electrical currents to be limited are below the electrical current threshold for each such current.

For a variant of any prior variant, the method further comprises varying any electrical current threshold of the method with any of: time and electrical conductor currents.

LEGEND

1. Three phase source
2. Off-utility grid energy source
3. Asymmetric three phase load
10. Electrical installation
11. Mains fuses or Mains circuit breaker
12. Distribution panel
13. Branch fuses
14. Outlets
15. Outlet connected (portable) loads
16. Permanently installed three phase load
17. Permanently installed single phase load
20. Load shedding device
21. Current transformers/sensors
22. Relays/contactors
30. Load transfer device
50. Current limiter
51. IGBT
52. DC link capacitor
53. Switch inductors
54. EMC filter
55. Control electronics
56. Diode
57. Boost inductor
58. Current transformers/sensors
59. Receiving unit
60. Limiting unit
61. Obtaining unit
62. Combined limiting and obtaining unit
63. Voltage sense node
101, 102, 103. Electrical conductor
111, 112, 113. Connecting conductor

The invention claimed is:

1. Device (50) for limiting an electrical current, from a source (1), in a first electrical phase conductor of an electrical installation, wherein the device (50) comprises a receiving unit (59) adapted to receive a measurement of the electrical current from the source (1), in the first electrical phase conductor, and further comprising a limiting unit (60) being adapted to limit said electrical current from the source (1), when the measured electrical current reaches a first threshold, wherein the device further comprises an obtaining unit (61) adapted to obtain electrical energy from a second electrical phase conductor, and wherein the limiting unit (60) is adapted to inject said obtained electrical energy as an electrical current into the first electrical phase conductor, whereby the injected electrical current constitutes a replacement for at least a part of the electrical current from the source (1), which electrical current from the source (1) is thereby limited.

2. Device (50) according to claim 1, wherein the obtaining unit (61) is adapted to obtain electrical energy also from at least one additional electrical conductor.

3. Device (50) according to claim 1, wherein the receiving unit (59) is adapted to receive a further measurement of a further electrical current to be limited in at least one further electrical phase conductor, and wherein the limiting unit (60) is adapted to inject said obtained electrical energy as an electrical current also into the at least one further electrical phase conductor when the further measured electrical current in that phase conductor reaches a second threshold.

4. Device (50) according to claim 1, wherein the obtaining unit (61) is adapted such that at least one conductor from which to obtain electric energy from is connectable to an off-utility grid electrical source (2).

5. Device (50) according to claim 1, wherein the receiving unit (59) is adapted to receive the measurement of the electrical current in any electrical conductor from which to obtain electrical energy and wherein the obtaining unit (61) is adapted to obtain electrical energy from any such electrical conductor when the measured electrical current of a particular such conductor is below a third threshold.

6. Device (50) according to claim 1, comprising an electrical energy storage element (52) in which the device (50) is adapted to store said electrical energy after it is obtained and prior to when the electrical energy is injected.

7. Device (50) according to claim 1, wherein a collective number of conductors from which to obtain or in which to inject electric energy and which are not connected to an off-utility grid source are three and constitutes three different alternating current phase conductors in a three phase electrical installation.

8. Device (50) according to claim 1, wherein the obtaining unit (61) and the limiting unit (60) are adapted to obtain and inject electrical energy in such a way to also at least reduce any harmonics in the electrical phase conductor into which the electrical energy is injected.

9. Device (50) according to claim 1, wherein the obtaining unit (61) and the limiting unit (60) are adapted to obtain and inject electrical energy in such a way to also correct a power factor less than one of the electrical phase conductor into which the electrical energy is injected.

10. Device (50) according to claim 1, wherein, in case of an electrical power outage of any electrical phase conductor into which the limiting device (50) is adapted to inject electrical energy, the limiting unit (60) is adapted to inject said obtained electrical energy into such an electrical phase conductor.

11. Device (50) according to claim 1, further comprising a disconnecting unit adapted to disconnect at least one load connected to any electrical phase conductor into which the limiting device (50) is adapted to inject electrical energy if the electrical energy available for injection is not enough to limit the electrical current in any such electrical conductor to an electrical current threshold, or below.

12. Device (50) according to claim 1, wherein the obtaining unit (61) and the limiting unit (60) are adapted to respectively refrain from obtaining and injecting any electrical energy when all electrical currents to be limited by the device (50) are below an electrical current threshold for each such current.

13. Device (50) according to claim 1, wherein the device (50) is adapted to vary any electrical current threshold of the device (50) with any of: time and electrical conductor currents, by setting said threshold higher for short duration peaks.

14. Electrical system comprising the device (50) according to claim 1.

15. Method for limiting an electrical current, from a source (1), in a first electrical phase conductor of an electrical installation, the method comprising the steps of:
measuring the electrical current from the source (1) in the first electrical phase conductor,
limiting said electrical current from the source (1) when the measured electrical current from the source (1) reaches a first threshold,
wherein the method further comprises the steps of:
obtaining electrical energy from a second electrical phase conductor, and limiting said first electrical current from the source (1) by injecting said obtained electrical energy as an electrical current into the first electrical phase conductor, whereby the injected electrical current constitutes a replacement for at least a part of the electrical current from the source (1), which electrical current from the source (1) is thereby limited.

16. Device (50) according to claim 2, wherein the receiving unit (59) is adapted to receive a further measurement of a further electrical current to be limited in at least one further electrical phase conductor, and wherein the limiting unit (60) is adapted to inject said obtained electrical energy as an electrical current also into the.at least one further electrical phase conductor when the further measured electrical current in that phase conductor reaches a second threshold.

17. Device (50) according to claim 2, wherein the obtaining unit (61) is adapted such that at least one conductor from which to obtain electric energy from is connectable to an off-utility grid electrical source (2).

18. Device (50) according to claim 2, wherein the receiving unit (59) is adapted to receive a measurement of an electrical current in any electrical conductor from which to obtain electrical energy and wherein the obtaining unit (61) is adapted to obtain electrical energy from any such electrical conductor when the measured electrical current of a particular such conductor is below a third threshold.

19. Device (50) according to claim 2, comprising an electrical energy storage element (52) in which the device (50) is adapted to store said electrical energy after it is obtained and prior to when it is injected.

20. Device (50) according to claim 2, wherein the collective number of conductors from which to obtain or in which to inject electric energy and which are not connected to an off-utility grid source are three and constitutes three different alternating current phase conductors in a three phase electrical installation.

* * * * *